United States Patent [19]

Condon

[11] Patent Number: 4,620,500
[45] Date of Patent: Nov. 4, 1986

[54] PRESSURE LOSS INDICATOR

[76] Inventor: James R. Condon, 45 Meadowbrook La., Hampden, Mass. 01051

[21] Appl. No.: 764,304

[22] Filed: Aug. 12, 1985

[51] Int. Cl.$^4$ ............................................. G01L 19/12
[52] U.S. Cl. .................................. 116/268; 116/215; 169/75; 239/71
[58] Field of Search ............... 116/268, 270, 272, 269, 116/215, 203, 1, 33, DIG. 25, 34 R, 34 A, 34 B; 215/365, 366; 169/23, 75; 200/83 A, 83 J, 83 P, 83 Q; 137/557; 340/611, 614, 626; 239/71

[56] References Cited

U.S. PATENT DOCUMENTS

| | | | |
|---|---|---|---|
| 2,477,725 | 8/1949 | Dall | 116/215 |
| 3,492,968 | 2/1970 | Workman, Jr. | 116/270 |
| 3,717,861 | 2/1973 | Wright, Jr. | 340/601 |
| 3,760,350 | 9/1973 | Johnson | 200/83 R |
| 3,939,316 | 2/1976 | Stropkay | 200/82 D |
| 4,049,935 | 9/1977 | Gruber | 200/83 P |

FOREIGN PATENT DOCUMENTS 580213 8/1946 United Kingdom .................. 299/95

Primary Examiner—Charles Frankfort
Assistant Examiner—W. Morris Worth

[57] ABSTRACT

A pressure loss indicator employs a diaphragm which assumes one of two stable convex configured states in accordance with the pressure differential across the diaphragm. A trigger is responsive to the state of the diaphragm to release an indicator pin from the assembly upon occurrence of a reduction in the ambient pressure which results in a pressure differential across the diaphragm. A reference pressure is established in a reference chamber at one side of the diaphragm, the reference chamber being selectively isolated from the ambient pressure by a check valve.

19 Claims, 3 Drawing Figures

PRESSURE LOSS INDICATOR

BACKGROUND OF THE INVENTION (1) Field of the Invention

This invention generally relates to the provision of an indication of a pressure loss. More particularly, this invention is directed to pressure loss indicators which may be employed for indicating the loss of pressure in pressurized gas cylinders or other pressurized containers. Accordingly, the general objects of the present invention are to provide novel and improved methods and apparatus of such character.

The present invention is particularly adapted for mounting entirely within a pressurized cylinder such as a fire extinguisher or a helium cylinder employed for inflating radar reflective balloons which provide a detection target for locating lost or disabled individuals in remote regions in emergency circumstances. Because in some applications a pressure loss of as small as 5% may result in insufficient gas being available to perform the intended function, a relatively compact, reliable and inexpensive pressure loss indicator is desirable from both a practical standpoint and (for many applications) from a safety standpoint. Accordingly, a general object of the present invention is to provide a new and improved pressure loss indicator having the foregoing characteristics. An additional general object of the present invention is to provide a pressure loss indicator which does not require modification of the wall or enclosure structure of the pressurized container and thus does not provide a potential additional leakage path.

(2) Description of the Prior Art

U.S. Pat. No. 3,910,223 discloses a device for sensing changes in pressure wherein a pair of chambers are separated by a membrane which carries a latch-operating ring. The operating ring engages a latch which normally prevents movement of a piston rod. One of the chambers is in fluid communication with a pressurized container in which the device is installed. A decrease of pressure results in unlatching of the piston rod so that the rod is displaced to an indicating position.

Devices which indicate a pressure loss or low pressure are also known in the art. U.S. Pat. No. 3,910,222 discloses the use of a membrane to divide a housing into a pair of chambers. A spring biased piston rod responsive to the position of the membrane energizes an audible alarm when the pressure of interest drops below a pre-determined level. U.S. Pat. Nos. 3,517,693, 4,232,698 and 4,297,687 disclose means for indicating low pressures in a gas cylinder. U.S. Pat. No. 2,798,449 and U.S. Pat. No. 2,967,509 disclose latch release means which indicate low pressure in a tire. U.S. Pat. No. 3,035,285 discloses a pressure responsive membrane which displaces a rod for releasing a reel having a line.

BRIEF SUMMARY OF THE INVENTION

Briefly stated, the invention in a preferred form is a new and improved pressure loss indicator comprising a generally cylindrical body which interiorly forms a chamber. A bi-stable diaphragm having a generally convex form is interiorly received by the body to divide the chamber into two regions. One of the regions is in continuous pressure communication with the ambient environment. The second region, i.e., the space at the opposite side of the diaphragm, is pressurized and sealed from the ambient environment. A trigger responsive to the state of the diaphragm normally retains an indicator pin in a first or captured position and releases the indicator pin when the state of the diaphragm changes. The indicator is adapted for mounting in a pressurized cylinder so that the diaphragm assumes a first state at a reference pressure, the second region being pressurized to the reference pressure. If the reference pressure decreases by a pre-established amount, the diaphragm inverts to its second state thereby forcing the trigger to release the indicator pin.

A check valve controls fluid communication between the second region and the ambient atmosphere. The check valve may be either a spring-biased ball valve or, in a more compact embodiment, a shaped elastomeric member. The trigger preferably comprises a spring-biased plunger which engages the diaphragm. The plunger has a slot which receives the indicator pin. A release slot is formed in the cylindrical body so that, with the diaphragm in a first state, the indicator pin is retained by the plunger. When the diaphragm inverts to its second state the pin is released for essentially free floating movement through the release slot. The released indicator pin will be caused to impinge against the interior wall of the pressurized cylinder in which the pressure loss indicator is installed upon shaking the cylinder to thereby provide an audible signal of the pressure reduction in the cylinder. The cylindrical body of the indicater is preferably threaded so that the indicator may be mounted in fixed position within the pressurized container.

DESCRIPTION OF THE DISCLOSED EMBODIMENTS

Figure 1:
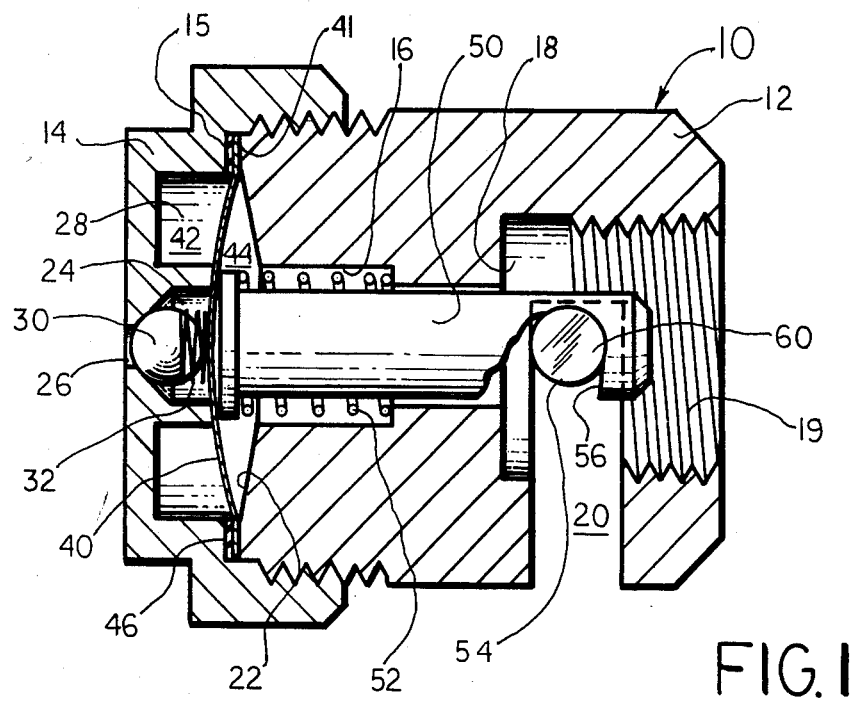
FIG. 1 is a side sectional view, partly in section and partly broken away, of a pressure loss indicator in accordance with the present invention.

With reference to the drawing, wherein like numerals represent like parts throughout the several FIGURES, a pressure loss indicator in accordance with the present invention is generally designated by the numeral 10. Pressure loss indicator 10 is designed for mounting within a pressurized container to provide an audible alarm upon a pre-determined pressure loss in the container.

Indicator 10 comprises a main body 12 of generally cylindrical form which threadably receives a cap 14. Main body 12 is preferably a metal member and includes a central concentric stepped axial bore 16 which opens at one end into an enlarged bore 18 partially traversed by a threaded surface 19. The threaded surface 19 is adapted for threaded engagement with a complementary internal hanger (not illustrated) which is integral with a pressurized container so that the indicator may be mounted in fixed position interiorly of the container. A substantially semi-circular transversely extending release slot 20 extends through the wall of the main body 12 to interiorly intersect the enlarged bore 18. A contoured surface 22 having a generally concave section is formed at the other end of the main body surrounding the opening of axial bore 16.

Cap 14 is preferably a metal member which is interiorly threaded for mating engagement with main body 12. Cap 14 is provided with an annular flange which defines a cavity 24. Cavity 24 is coaxial with and in communication with a narrow passage 26. Cap 14 further defines a generally annular-shaped recess 28 which is also co-axial with cavity 24 and passage 26. Cavity 24 is tapered adjacent to passage 26 to provide a conical seat for receiving a ball valve 30. A coil spring 32 biases ball valve 30 thus providing one-way pressure communication between passage 26 and the interior cavities 24 and 28.

A diaphragm 40 having an integral peripheral mounting rim 41 is captured between the end of main body 12 and a cooperating retaining shoulder 15 of cap 14. Diaphragm 40 divides the interior cavity formed by the cap/main body assembly into a reference chamber 42 and a monitoring chamber 44. Chambers 42 and 44 are, once the pressure within a container in which the indicator is mounted has reached the desired level during pressurization, in mutual pressure isolation. Diaphragm 40 may, for example, be a pressure responsive stainless steel member having a bi-stable convex configuration. The diaphragm retains the stable convex configuration illustrated in the drawing until a pressure differential (resulting from the pressure in reference chamber 42 exceeding the pressure in monitoring chamber 44) forces the diaphragm to a second complementary convex configuration generally conforming to the concave surface 22 at the end of the main body. The force or pressure differential required to cause the diaphragm to "switch" from the illustrated stable configuration to its inverted second or trigger configuration (not illustrated) is pre-established by the dimensions of the diaphragm, the concavity of the diaphragm and the compressive strength of the diaphragm material. In addition, and/or in the alternative, a plurality of diaphragms may be employed in conformal surface to surface relationship to obtain the desired pre-established threshold pressure differential characteristics. A vellum gasket 46 is interposed between the mounting rim 41 of the diaphragm and the retaining shoulder 15 of the cap member to provide a fluid tight relationship at the cap/diaphragm/main body interface.

A trigger assembly comprising a plunger 50 is slidably received in axial bore 16 for axial displacement therein. A compression spring 52 encircles plunger 50 in the enlarged portion of axial bore 16 to normally bias plunger 50 into engagement against the central apex portion of diaphragm 40. The free end of plunger 50 extends into enlarged bore 18. An asymmetrical receiving slot 54 is formed at the free end of plunger 50. Slot 54 is contoured to form a catch 56.

An indicator pin 60 is selectively captured in receiving slot 54 as illustrated in FIG. 1. When the diaphragm is in the stable illustrated configuration, the edges of the release slot 20 formed by the main body cooperate with catch 56 (which is interposed in slot 20) to retain the indicator pin 60 in position. Indicator pin 60 may be of a rod-like form or may assume numerous other configurations. Upon displacement of the center portion diaphragm 40 to the trigger position, plunger 50 is correspondingly axially displaced so that catch 56 is withdrawn from the release slot 20 thereby allowing the indicator pin 60 to be released from slot 54.

In operation, the pressure loss indicator 10 is mounted in fixed position within a tank by threadably engaging the threaded surface 19 with a hanger at the interior of the tank (not illustrated). The tank is pressurized to, for example, a pressure of 1800 psi. Pressurized gas communicates through passage 26 via ball valve 30 to the reference chamber 42 which is substantially defined by annular recess 28, cavity 24 and a first side of diaphragm 40. Pressurized gas also continuously communicates via axial bore 16 to monitoring chamber 44 defined by axial bore 16, surface 22 and the other side of diaphragm 40. When the indicator is initially exposed to the pressurized fluid within the tank, the pressures in chambers 42 and 44 are substantially equal. Substantially equal pressures are thus applied to opposing sides of diaphragm 40, and diaphragm 40 assumes the stable illustrated configuration. Upon equalization of the pressure between reference chamber 42 and the surrounding pressure within the tank, the bias of spring 32 closes ball valve 30, thus isolating reference chamber 42 from the interior of the tank. Monitoring chamber 44 remains in continuous pressure communication via bores 6 and 18 with the interior of the tank.

In the event that the pressure within the tank decreases, a pressure differential will be established across diaphragm 40. When the pressure in reference chamber 42 exceeds the pressure in monitoring chamber 44 by a pre-established value such as, for example, when the tank pressure decreases to approximately 1700 psi, the pressure differential induced force applied against diaphragm 40 will be sufficient to cause the diaphragm to snap to its second convex configured state and, in so doing, to overcome the bias of spring 52. In its second stable state the diaphragm essentially conforms to surface 22, and the central apex portion of the diaphragm is axially displaced from its initial position. Plunger 50 is correspondingly displaced (to the right in the drawing) so that the catch 56 is withdrawn from the release slot 20, and the indicating pin 60 is released from the trigger assembly to essentially freely float within the tank. The indicator pin 60 is preferably made of steel so that the impinging of the pin against the walls of the tank provides a readily discernable audible indication that the pressure has decreased below the pre-established level. Thus, the pressurized tank may be checked for sufficient pressure by simply shaking the tank to audibly detect whether or not the pin is free to impinge against the tank. The indicator pin need not be freely disengageable from the indicator as described, but may be movably restrained within the indicator so that the pin will be readily recaptured upon repressurizing the container.

It should be appreciated that the foregoing pressure loss indicator has a very efficient and compact form which provides an audible indication of a pressure reduction without requiring that the pressurized container be unpacked and without requiring an auxiliary connection between the interior and exterior of the pressurized container. The indicator may also be used by blind individuals or even deaf individuals since detectable vibrations may be produced by the impingement of the indicator pin against the container.

As an example of a preferred application of the foregoing invention, the indicator 10 may be employed in a helium filled container pressurized at approximately 1800 psi such as the type of container having approximately a 2½ inch diameter and 4 inch length. The helium may be employed for inflating a metallic radar reflective mylar balloon used by explorers, mountain climbers, aviators, etc. for providing a means whereby aircraft radar may locate individuals at great distances in emergency circumstances. If as little as five percent of the helium leaks from such a device, the safety device may be rendered useless. The indicator 10 for the foregoing application ma be programmed to indicate a relatively small pressure decrease of approximately 50 psi at an accuracy on the order of two percent which is well within an acceptable safety margin.

Figure 2:
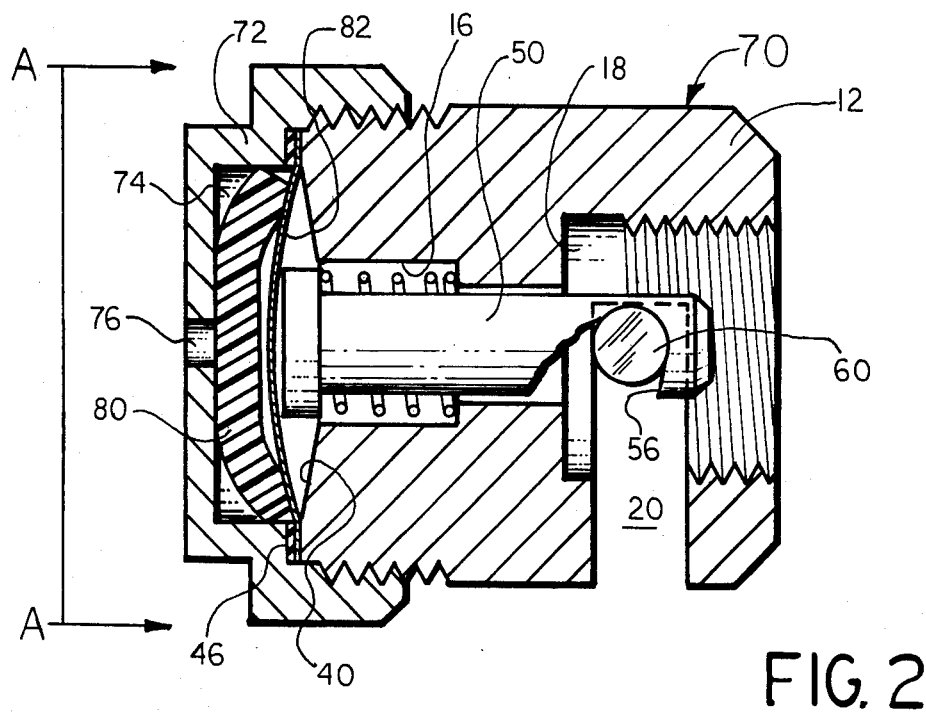
FIG. 2 is a side sectional view, partly in section and partly broken away, of a second embodiment of a pressure loss indicator in accordance with the present invention.
Figure 3:
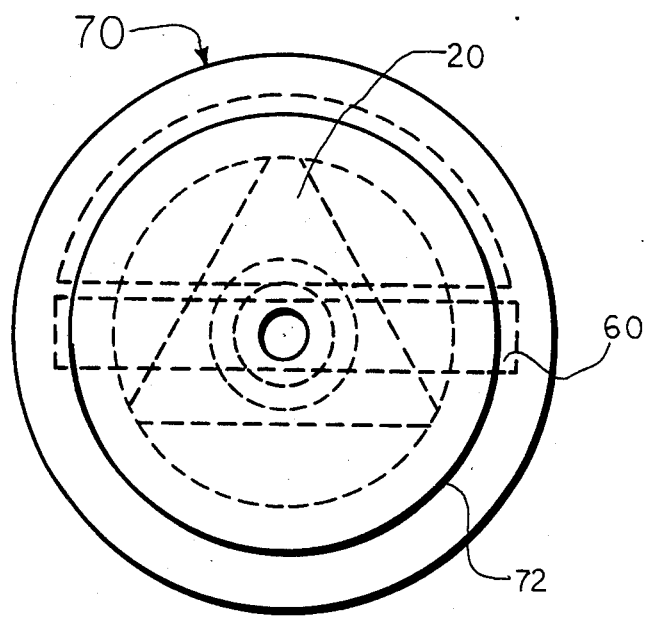
FIG. 3 is an end view, partly in phantom, of the embodiment of FIG. 2.

With reference to FIGS. 2 and 3, a second embodiment of a pressure loss indicator in accordance with the present invention is generally designated by the numeral 70. Indicator 70 is a more compact embodiment which differs from indicator 10 primarily by the cap and check valve configurations. Cap 72 is an alumimum member forming a generally cylindrical cavity 74 and a central narrow inlet passage 76. A generally triangular-shaped elastomer member 80 is received in cavity 74 to form a check valve. Member 80 may be formed of butyl or other materials and has suitable resilience so that it may seal selectively against the cap interior to close passage 76. In a preferred form, member 80 is a thin flat member having a generally uniform 1/16 inch thickness. Upon equalization of the pressure in the reference chamber 82 and the surrounding container pressure, diaphragm 40 cooperates with member 80 to bias the sealing member 80 into sealing engagement against the cap interior for closing-off the reference chamber to pressure communication via passage 76. The remaining components of the indicator 70 are substantially identical to those previously described relative to indicator 10 and function in substantially the same manner for releasing the indicator pin to indicate a surrounding reduction in pressure.

While preferred embodiments of the foregoing invention have been set forth for purposes of illustration, the foregoing description should not be deemed a limitation of the invention herein. Accordingly, various modifications, adaptations and alternatives may occur to one skilled in the art without departing from the spirit and scope of the present invention.

What is claimed is:

1. A pressure loss indicator for indicating a pressure decrease from a reference ambient pressure of the surroundings comprising:

body means for defining a chamber;

diaphragm means received by said body means for dividing said chamber into two regions, one of said regions being in continuous pressure communication with the ambient surroundings and the other of said regions being in selective pressure communication with the ambient surroundings, said diaphragm means having a portion which is displaceable between two positions in accordance with the difference in pressure between said regions;

check valve means positioned in said body means to control pressure communication between said other region and the ambient surroundings;

indicator means to indicate a pressure decrease in the ambient pressure of the surroundings; and trigger means to selectively retain said indicator means at a first position of said diaphragm displaceable portion and to release said indicator means at the second position of said diaphragm displaceable portion, said trigger means being responsive to a position of said diaphragm means displaceable portion so that at a reference ambient pressure said indicator means is retained by said trigger means and upon a decrease of said ambient pressure, said trigger means is displaced to release said indicator means to indicate a pressure decrease upon sensory perception of the releasing of the indicator means.

2. The pressure loss indicator of claim 1 wherein said diaphragm means includes a bi-stable member the center region of which is displaceable between genrally opposing complementary convex configurations.

3. The pressure loss indicator of claim 1 wherein the check valve is a spring-biased ball valve.

4. The pressure loss indicator of claim 1 wherein the check valve is a self-biased flexible member.

5. The pressure loss indicator of claim 1 wherein said trigger means comprises a spring biased, axially displaceable plunger which contacts said diaphragm means.

6. The pressure loss indicator of claim 5 wherein said plunger forms a slot for receiving said indicator means and said body means forms a cooperating release slot so that when said diaphragm means displacable portion is in the first position said indicator means may be retained by said plunger and in the second position of said diaphragm means displacable portion said indicator means is released for movement through said release slot.

7. The pressure loss indicator of claim 5 wherein said plunger is displaceable along a displacement axis and said body means further forms a threaded engagement surface generally co-axial with the displacement axis of said plunger.

8. A pressure loss indicator for indicating a pressure decrease from a reference ambient pressure of the surroundings comprising:

a generally cylindrical body member interiorly forming an axial bore leading to a co-axial enlarged threaded bore and a release slot opening through a side of said member into said enlarged bore;

a cap member threaded to said body member and forming an inlet passage;

a bi-stable diaphragm captured between said cap member and body member and forming a first chamber and a second chamber, said first chamber opening via said inlet passage for selective pressure communication with the surroundings and said second chamber opening through said axial bore for continuous pressure communication with the surroundings;

a check valve disposed in said first chamber to selectively seal said chamber against pressure communication with the surroundings; and a trigger assembly comprising a spring biased plunger engaging said diaphragm and selectively retaining an indicator pin, said plunger being axially displaceable in said axial bore in response to said diaphragm to release said indicator pin for movement through said release slot when the ambient pressure of the surroundings decreases to a level below that of the pressure in the first chamber.

9. The pressure loss indicator of claim 8 wherein said diaphragm is displaceable between two stable substantially convex configurations in accordance with the difference in pressure between said first chamber and said second chamber.

10. The pressure loss indicator of claim 9 wherein said check valve further comprises a self biased flexible member which is biased by said diaphragm for engagement against said cap to seal said inlet passage.

11. The pressure loss indicator of claim 10 wherein said self-biased member is comprised of an elastomer.

12. The pressure loss indicator of claim 10 wherein said self-biased member has a generally triangular shape.

13. The pressure loss indicator of claim 11 wherein said self-biased member has a generally triangular shape.

14. The pressure loss indicator of claim 9 wherein said diaphragm is a metal membrane.

15. The pressure loss indicator of claim 13 wherein said diaphragm is a metal membrane.

16. The pressure loss indicator of claim 9 wherein said check valve includes a biasing spring which causes said valve to normally be in a closed state.

17. The pressure loss indicator of claim 16 wherein said diaphragm is a metal membrane.

18. The pressure loss indicator of claim 7 wherein said self-biased member is comprised of an elastomer.

19. The pressure loss indicator of claim 18 wherein said self-biased member has a generally triangular shape.

* * * * *